US009188485B1

(12) United States Patent
 Kim et al.

(10) Patent No.: US 9,188,485 B1
(45) Date of Patent: Nov. 17, 2015

(54) APPARATUS AND METHOD FOR EXTREME ULTRAVIOLET SPECTROMETER CALIBRATION

(71) Applicant: KOREA INSTITUTE OF SCIENCE AND TECHNOLOGY, Seoul (KR)

(72) Inventors: Sun Ho Kim, Seoul (KR); Yong Soo Kim, Seoul (KR); Jae Hun Kim, Seoul (KR); Min-Chul Park, Seoul (KR); Young Tae Byun, Guri-si (KR); Min Ah Seo, Seoul (KR); Joon Mo Ahn, Seoul (KR); Deok Ha Woo, Seoul (KR); Seok Lee, Seoul (KR); Taik Jin Lee, Seoul (KR); Young Min Jhon, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/490,948

(22) Filed: Sep. 19, 2014

(30) Foreign Application Priority Data

May 29, 2014 (KR) ........................ 10-2014-0065251

(51) Int. Cl.
 *G01D 18/00* (2006.01)
 *G01J 3/02* (2006.01)
 *G01J 3/10* (2006.01)
 *G01J 3/28* (2006.01)

(52) U.S. Cl.
 CPC ................. *G01J 3/0297* (2013.01); *G01J 3/10* (2013.01); *G01J 3/2803* (2013.01); *G01J 2003/282* (2013.01)

(58) Field of Classification Search
 CPC ................. G01J 3/02; G01J 3/28; G01J 3/10; G01J 1/429; G01J 3/0297; G01N 21/33; G03F 7/70033
 See application file for complete search history.

(56) References Cited

U.S. PATENT DOCUMENTS

2014/0253897 A1* 9/2014 Liu et al. ......................... 355/71

FOREIGN PATENT DOCUMENTS

KR 101078135 B1 10/2011
KR 101349898 B1 1/2014

OTHER PUBLICATIONS

Bista et al., "Absolute calibration of a 1.5 m grazing incidence monochromator for extreme ultraviolet (EUV) diagnostics of a plasma source," 2007, Nuclear Instruments and Methods in Physics Research B, vol. 261, pp. 166-169.*

* cited by examiner

*Primary Examiner* — Kiho Kim
(74) *Attorney, Agent, or Firm* — Ladas & Parry LLP (57) ABSTRACT

Disclosed are herein an apparatus and method for extreme ultraviolet (EUV) spectroscope calibration. The apparatus for EUV spectroscope calibration includes an EUV generating module, an Al filter, a diffraction grating, a CCD camera, a spectrum conversion module, and a control module that compares a wavelength value corresponding to a maximum peak among peaks of the spectrum depending on the order of the EUV light converted from the spectrum conversion module with a predetermined reference wavelength value depending on an order of high-order harmonics to calculate a difference value with the closest reference wavelength value, and controls the spectrum depending on the order of the EUV light converted from the spectrum conversion module to be moved in a direction of wavelength axis by the calculated difference value. Thus, it is possible to accurately measure a wavelength of a spectrum of EUV light used in EUV exposure technology and mask inspection technology.

10 Claims, 11 Drawing Sheets

APPARATUS AND METHOD FOR EXTREME ULTRAVIOLET SPECTROMETER CALIBRATION

CROSS-REFERENCE TO RELATED APPLICATION

This application claims priority to and the benefit of Korean Patent Application No. 2014-0065251, filed on May 29, 2014, the disclosure of which is incorporated herein by reference in its entirety.

BACKGROUND

1. Field of the Invention

The present invention relates to an apparatus and method for extreme ultraviolet (EUV) spectroscope calibration, and more particularly, to an apparatus and method for EUV spectroscope calibration which may accurately measure a spectrum of EUV light used in EUV exposure technologies and mask inspection technologies.

2. Discussion of Related Art

In general, electromagnetic radiation (also referred to as "soft X-ray") having a wavelength of approximately 124 nm or less while having extreme ultraviolet (EUV) light, for example, light with a wavelength of approximately 13.5 nm may be used in a photolithography process for forming a very small pitch on a substrate, for example, a silicon wafer.

That is, EUV and X-rays are included in a region having wavelengths shorter than those of visible rays, may improve a measurement resolution by a diffraction limit that is limited by sizes of wavelengths in a precision measurement using light, and may be utilized in micromeasurement or nondestructive inspection related to biotechnologies using excellent transmission characteristics due to extension up to the X-ray region.

In particular, simultaneously, when a light source having excellent coherency can be generated, a variety of applications using the interference and diffraction phenomenon of light are possible. In addition, the EUV and X-rays can maintain the repeatability of entering femto-second laser, and therefore can be used in precision spectroscopy or frequency standard measurement in the EUV and X-ray regions.

Among various methods for generating such EUV and X-rays, a method using a synchrotron may be used. When generating the EUV and X-rays using the synchrotron, it is possible to obtain several different wavelength bands while obtaining a large amount of light with excellent quality, but the facility itself is very large in its size and expensive and therefore a laboratory cannot be simply configured.

As a method for overcoming the above-mentioned problem, a high-order harmonic generation (HHG) method using a high output femto-second pulse laser has been suggested, and therefore coherent EUV and soft X-rays can be generated using a relatively small experimental apparatus.

In the HHG method, by applying a high time-varying electric field to an inert gas such as Ar, Ne, Xe, or the like, electrons are ionized, moved along the trajectory, and then are recombined again, and therefore energy corresponding to a sum of ionization energy and kinetic energy of the electrons may be generated as EUV light or light in X-ray bands.

Conventionally, in order to generate such HHG, it is designed that the inert gas is injected into a gascell and the used inert gas naturally flows out of the gascell.

In addition, EUV may be generated even through lithium, tin, or a semiconductor device as well as the inert gas such as Ar, Ne, Xe, or the like, but a gas may be used as a medium due to HHG using the gascell. This is because a medium for allowing EUV to be generated by HHG using the gascell is only the inert gas due to the current technologies. EUV may be generated through other methods as well as the method of generating EUV using the inert gas.

Meanwhile, according to demands for ultraminiaturization of a semiconductor process for high integration, development up to ArF (193 nm) while passing through G line (436 nm), I line (365 nm), and KrF (248 nm) has been conducted as a light source used in exposure technologies.

Thereafter, new exposure technologies that increase resolution in a semiconductor process of 90 nm or less have been required, ArF immersion exposure technology and double-patterning exposure technology have been developed, and therefore a mass production up to a process of DRAM of 23 nm and NAND flash of 20 nm has been succeeded.

As next generation exposure technologies for overcoming the ArF exposure technology, several technologies have been studied, and research and development on EUV exposure technology among these technologies have been actively conducted worldwide such as reaching a stage of test production by major semiconductor companies, and the like.

Meanwhile, in order to inspect a defect of a mask manufactured by the EUV exposure technology, EUV light is similarly needed. In particular, technology in which the defect of the mask is inspected with the same wavelength as a wavelength used in the exposure technology is referred to as actinic mask inspection technology. In order to generate EUV with the same wavelength as an EUV wavelength used in the exposure technology, an HHG method is needed. In order to check whether the EUV light generated in the HHG method is suitable for a wavelength to be used, a spectrum should be measured using an EUV spectroscope, and in this instance, calibration of the spectroscope should be performed in order to measure the accurate spectrum. As a calibration method of the EUV light, a method using an atomic line which has been traditionally used may be used. Fluorescence lines which are inherent for each inert gas are referred to as atomic lines. Since wavelength values of an atomic line spectrum have been already studied several decades ago and thereby widely known, calibration may be performed on EUV light based on the position of the atomic line spectrum and the wavelength value thereof.

However, in order to obtain energy with an intensity that can be measured by a CCD camera of the spectroscope, energy which is several times higher than energy of a laser used in HHG is needed. Thus, a laser light source that can output energy higher than that of a laser for generating high-order harmonics for EUV is necessarily needed.

Prior Patent Document 1: Korean Patent Registration No. 10-10789135

SUMMARY OF THE INVENTION

The present invention is directed to an apparatus and method for extreme ultraviolet (EUV) spectroscope calibration, which can accurately measure a wavelength of a spectrum of EUV light used in EUV exposure technology and mask inspection technology.

According to a first aspect of the present invention, there is provided an apparatus for extreme ultraviolet (EUV) spectroscope calibration including: an EUV generating module that generates EUV light by interaction of a laser beam and an inert gas inside a vacuum chamber; an Al filter that transmits a wavelength of a specific band among wavelengths of the EUV light generated from the EUV generating module; a diffraction grating that separates the EUV light transmitted from the Al filter for each wavelength; a CCD camera that photographs the EUV light with a specific band wavelength separated from the diffraction grating; a spectrum conversion module that converts pixels of an image photographed from the CCD camera into wavelengths to show the wavelengths in a spectrum depending on an order of the EUV light; and a control module that compares a wavelength value corresponding to a maximum peak among peaks of the spectrum depending on the order of the EUV light converted from the spectrum conversion module with a predetermined reference wavelength value depending on an order of high-order harmonics to calculate a difference value with the closest reference wavelength value, and controls the spectrum depending on the order of the EUV light converted from the spectrum conversion module to be moved in a direction of wavelength axis by the calculated difference value.

Preferably, when a Zr filter for transmitting the wavelength of the specific band among the wavelengths of the EUV light generated from the EUV generating module and blocking a wavelength band of a femto-second laser is disposed in the same position as that of the Al filter in a state in which the Al filter is removed, EUV light transmitted from the Zr filter may be transmitted to the diffraction grating, the EUV light output from the diffraction grating may be photographed by the CCD camera, pixels of an image photographed from the CCD camera may be converted into wavelengths by the spectrum conversion module to show the wavelengths in the spectrum depending on the order of the EUV light, and the spectrum depending on the order of the EUV light converted from the spectrum conversion module may be controlled, by the control module, to be moved in the direction of wavelength axis by the calculated difference value.

Preferably, the Zr filter may block peripheral wavelengths in a fixed range with respect to 800 nm that is a peak wavelength of a femto-second laser beam, and transmit a wavelength of a specific band in a range of 7 nm to 17 nm.

Preferably, the wavelength of the specific band transmitted by the Al filter may be in a range of 17 nm to 60 nm.

According to a second aspect of the present invention, there is provided an apparatus for EUV spectroscope calibration including: an EUV generating module that generates EUV light by interaction of a laser beam and an inert gas inside a vacuum chamber; a beam splitter that splits the EUV light generated from the EUV generating module into reflected light and transmitted light by transmitting and reflecting the EUV light at a constant ratio; a reflector that again vertically reflects the reflected light vertically split from the beam splitter; a diffraction grating that separates, for each wavelength, the reflected light reflected from the reflector and the transmitted light split from the beam splitter; an Al filter that transmits a wavelength of a specific band among wavelengths of the transmitted light separated from the diffraction grating; an Zr filter that transmits a wavelength of a specific band among wavelengths of the reflected light separated from the diffraction grating and blocks a wavelength band of a femto-second laser; a CCD camera that photographs the EUV light transmitted from each of the Al filter and the Zr filter; a spectrum conversion module that converts pixels of an image photographed from the CCD camera into wavelengths to show the wavelengths in a spectrum depending on an order of the EUV light; and a control module that compares a wavelength value corresponding to a maximum peak among peaks of the spectrum depending on the order of the EUV light converted from the spectrum conversion module and passing through the Al filter and the Zr filter with a predetermined reference wavelength value depending on an order of high-order harmonics to calculate a difference value with the closest reference wavelength value, and controls the spectrum depending on the order of the EUV light converted from the spectrum conversion module and passing through the Al filter and the Zr filter to be moved in a direction of wavelength axis by the calculated difference value.

According to a third aspect of the present invention, there is provided a method for EUV spectroscope calibration including: (a) generating EUV light by interaction of a laser beam and an inert gas inside a vacuum chamber; (b) transmitting, by an Al filter, a wavelength of a specific band among wavelengths of the EUV light generated in the (a) generating; (c) separating, by a diffraction grating, the EUV light transmitted in the (b) transmitting for each wavelength; (d) photographing, by a CCD camera, the EUV light with a specific band wavelength separated in the (c) separating; (e) converting, by a spectrum conversion module, pixels of an image photographed in the (d) photographing into wavelengths to show the wavelengths in a spectrum depending on an order of the EUV light; and (f) comparing, by a control module, a wavelength value corresponding to a maximum peak among peaks of the spectrum depending on the order of the EUV light converted in the (e) converting with a predetermined reference wavelength value depending on an order of high-order harmonics to calculate a difference value with the closest reference wavelength value, and moving the spectrum depending on the order of the EUV light converted in the (e) converting in a direction of wavelength axis by the calculated difference value.

Preferably, after the (f) comparing, when a Zr filter is disposed in the same position as that of the Al filter in a state in which the Al filter in the (b) transmitting is removed, the method for EUV spectroscope calibration may further include: (g) transmitting, by the Zr filter, the wavelength of the specific band among the wavelengths of the EUV light generated in the (a) generating and blocking a wavelength band of a femto-second laser; (h) separating, by the diffraction grating, the EUV light transmitted in the (g) transmitting for each wavelength; (i) photographing, by the CCD camera, the EUV light with a specific band wavelength separated in the (h) separating; (j) converting, by the spectrum conversion module, pixels of an image photographed in the (i) photographing into wavelengths to show the wavelengths in the spectrum depending on the order of the EUV light; and (k) moving, by the control module, the spectrum depending on the order of the EUV light converted in the (j) converting in the direction of wavelength axis by the difference value calculated in the (f) comparing.

Preferably, the Zr filter in the (g) transmitting may block peripheral wavelengths in a fixed range with respect to 800 nm that is a peak wavelength of a femto-second laser beam, and transmit a wavelength of a specific band in a range of 7 nm to 17 nm.

Preferably, the wavelength of the specific band transmitted by the Al filter in the (b) transmitting may be in a range of 17 nm to 60 nm.

According to a fourth aspect of the present invention, there is provided a method for EUV spectroscope calibration including: (a') generating EUV light by interaction of a laser beam and an inert gas inside a vacuum chamber; (b') splitting, by a beam splitter, the EUV light generated in the (a') generating into reflected light and transmitted light by transmitting and reflecting the EUV light at a constant ratio; (c') again vertically reflecting, by a reflector, the reflected light vertically split in the (b') splitting; (d') separating, by a diffraction grating, the reflected light reflected in the (c') again vertically reflecting and the transmitted light split in the (b') splitting for each wavelength; (e') transmitting, by an Al filter, a wavelength of a specific band among wavelengths of the transmitted light separated in the (d') separating; (f') transmitting, by a Zr filter, a wavelength of a specific band among wavelengths of the reflected light separated in the (d') separating and blocking a wavelength band of a femto-second laser; (g') photographing, by a CCD camera, the EUV light transmitted in the (e') transmitting and the (f) transmitting; (h') converting, by a spectrum conversion module, pixels of an image photographed in the (g') photographing into wavelengths to show the wavelengths in a spectrum depending on an order of the EUV light; and (i') comparing, by a control module, a wavelength value corresponding to a maximum peak among peaks of the spectrum depending on the order of the EUV light converted in the (h') converting and passing through the Al filter and the Zr filter with a predetermined reference wavelength value depending on an order of high-order harmonics to calculate a difference value with the closest reference wavelength value, and moving the spectrum depending on the order of the EUV light converted in the (h') converting and passing through the Al filter and the Zr filter in a direction of wavelength axis by the calculated difference value.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these teens. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
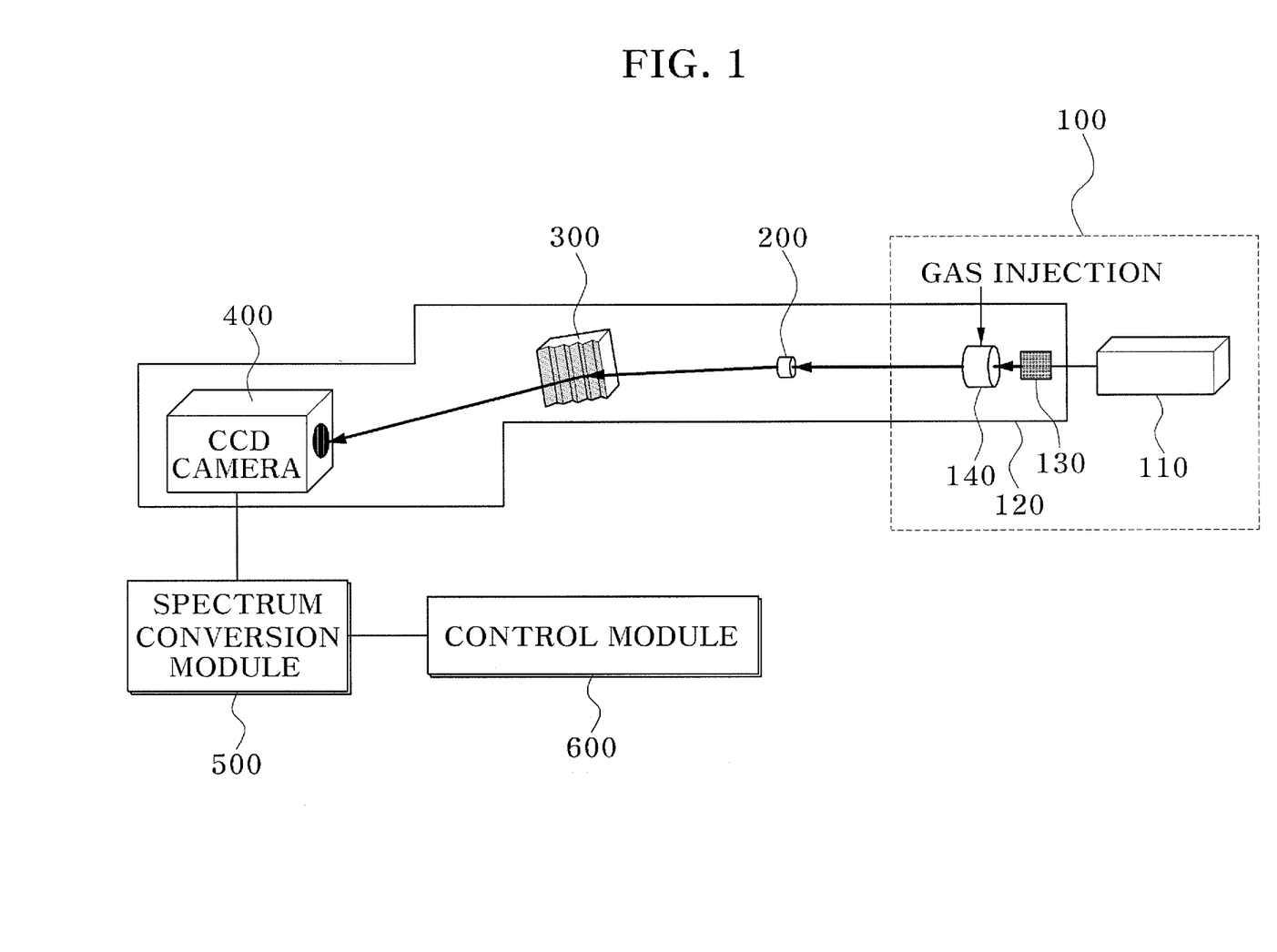
FIG. 1 is an overall conceptual diagram illustrating an apparatus for extreme ultraviolet (EUV) spectroscope calibration according to an embodiment of the present invention.

FIG. 1 is an overall conceptual diagram illustrating an apparatus for extreme ultraviolet (EUV) spectroscope calibration according to an embodiment of the present invention.

Referring to FIG. 1, the apparatus for EUV spectroscope calibration according to an embodiment of the present invention roughly includes an EUV generating module 100, an Al filter 200, a diffraction grating 300, a CCD camera 400, a spectrum conversion module 500, and a control module 600.

Here, the EUV generating module 100 is a module for generating EUV light by interaction of a laser beam and an inert gas inside a vacuum chamber, and includes a laser beam generating unit 110, a vacuum chamber 120, a plurality of optical members 130, and an EUV generating unit 140.

The laser beam generating unit 110 is a laser oscillator that outputs a light intensity of approximately $10^{11}$ W/cm², and outputs a femto-second laser as a light source for high-order harmonic generation (HHG) according to embodiments of the present invention.

The laser beam generating unit 110 according to an embodiment of the present invention has a femto-second pulse width of 35, and outputs a femto-second laser through a laser oscillator using titanium sapphire as a laser gain medium. Obviously, conditions such as a pulse width, a wavelength, and the like of such femto-second laser can be changed to various embodiments such as an optical fiber-based femto-second laser and the like in accordance with the purpose of use or environment.

In addition, the femto-second laser generated in the laser beam generating unit 110 is a femto-second laser that has a laser repeatability of 1 kHz and has energy of several mJ per maximum pulse.

The vacuum chamber 120 is a chamber for maintaining an internal environment of the vacuum chamber 120 in a vacuum state. Here, a pressure inside the chamber through which EUV light passes is preferably approximately $10^{-5}$ Torr or less, and a partial pressure of oxygen and moisture is preferably as low as possible.

Meanwhile, almost all environments except the laser beam generating unit 110 are preferably achieved inside the vacuum chamber 120. That is, an EUV light source is all absorbed in the atmosphere and thereby generation of the EUV light source should be achieved inside the vacuum chamber 120, and when the EUV light source is generated, characteristic analysis of the generated EUV light source should be also performed inside the vacuum chamber 120.

The plurality of optical members 130 are disposed inside the vacuum chamber 120 and used to appropriately transmit a high-output laser beam generated from the laser beam generating unit 110. For example, a path of a laser beam generated from the laser beam generating unit 110 through first and second optical members (not shown) constituted of a reflecting mirror is changed and a position of the laser beam is adjusted, and therefore the laser beam is directed to a third optical member (not shown) constituted of a concave mirror. The laser beam changed from the first and second optical members through the third optical member is reflected and condensed to a fourth optical member (not shown) constituted of a reflecting mirror, and the laser beam condensed from the third optical member through the fourth optical member is reflected to be transmitted to the EUV generating unit 140. The number and disposition of such a plurality of optical members can be changed in various ways in accordance with design by those skilled in the related art.

In particular, the EUV generating unit 140 for generating EUV according to the embodiments of the present invention may inject an inert gas required for generating the EUV light source with a wavelength band of about several tens of nanometers to several nanometers, and maintain a constant pressure by collecting the inert gas.

Such an EUV generating unit 140 is disposed inside the vacuum chamber 120 for generating EUV, constituted of a housing forming the whole body, and generates EUV light by interaction of the laser beam and an external inert gas (for example, helium (He), neon (Ne), argon (Ar), or the like).

In HHG through the EUV generating unit 140 according to the embodiments of the present invention configured as above, for example, by applying a high time-varying electric field to the inert gas containing helium (He), neon (Ne), or argon (Ar), or their mixed gas, electrons are ionized, moved along the trajectory, and then recombined again, and therefore energy corresponding to a sum of ionization energy and kinetic energy of the electrons may be generated as the EUV light.

That is, when the femto-second laser beam is made incident on atoms of the inert gas condensed to the housing of the EUV generating unit 140, electrons within the atoms of the inert gas contained in the housing by a strong electric field of the laser come out of the atoms by a tunneling effect and are ionized.

The electrons ionized in this manner are accelerated by the strong electric field of the applied laser without being affected by the atoms any longer, and has kinetic energy while being accelerated. Thereafter, the electrons are combined with the atoms again while the electric field of the laser is changed. In this instance, by the kinetic energy obtained by the laser and the recombination of the atoms and the electrons, energy corresponding to a sum of the generated ionization energy is emitted as light, and the light becomes the EUV light source.

The generated EUV light is absorbed and eliminated by impurities in the atmosphere, and therefore generation of the EUV light should be achieved in a vacuum environment, that is, inside the vacuum chamber 120. In addition, components excluding the laser beam generating unit 110 and components of the spectrum conversion module 500 and the control module 600 are preferably provided inside the vacuum chamber 120.

Meanwhile, the EUV generating unit 140 according to the embodiments of the present invention configured as above is specifically described in the prior art of Korean Patent Application No. 2012-0095715 (module for generating EUV light) filed by the same applicant, and for a detailed description thereof, refer to the prior art. In addition, in addition to the prior art, the EUV generating unit 140 is not limited to its type as long as it can generate EUV light with a desired wavelength.

The Al filter 200 transmits a wavelength of a specific band among wavelengths of the EUV light generated from the EUV generating module 100 (for example, transmits ≥67% light in a range of approximately 17 nm to 60 nm and transmits <10% light in a range of approximately 17 nm or less).

Meanwhile, conventionally, the spectrum of the EUV light is measured without using the Al filter 200, but in this instance, a light source (fs laser) having energy of 10 mJ or more is needed to cause an increase in costs.

The diffraction grating 300 separates the EUV light transmitted from the Al filter 200 for each wavelength.

The CCD camera 400 photographs the EUV light with a specific band wavelength separated from the diffraction grating 300.

The spectrum conversion module 500 converts pixels of an image photographed from the CCD camera 400 into wavelengths to show the wavelengths in a spectrum depending on an order of the EUV light.

The control module 600 compares a wavelength value corresponding to a maximum peak among peaks of the spectrum depending on the order of the EUV light converted from the spectrum conversion module 500 with a predetermined reference wavelength value (theory value, see table of FIG. 4) depending on an order of high-order harmonics to calculate a difference value with the closest reference wavelength value, and controls the spectrum depending on the order of the EUV light converted from the spectrum conversion module 500 to be moved in a direction of wavelength axis by the calculated difference value.

That is, in the spectrum passing through the Al filter 200 due to characteristics of the Al filter 200 (transmission is rapidly reduced to less than 10% at 17.1 nm or less), the whole spectrum depending on the order of the EUV light converted from the spectrum conversion module 500 is moved in accordance with the reference wavelength value (theory value) depending on a predetermined order of the high-order harmonics, and then accurate wavelength values of peaks may be obtained.

Meanwhile, when a Zr filter (not shown) for transmitting the wavelength of the specific band among the wavelengths of the EUV light generated from the EUV generating module 100 and blocking a wavelength band of a femto-second laser is disposed in the same position as that of the Al filter 200 in a state in which the Al filter 200 is removed, it is preferable that EUV light transmitted from the Zr filter be transmitted to the diffraction grating 300, the EUV light output from the diffraction grating 300 be photographed by the CCD camera 400, pixels of an image photographed from the CCD camera 400 be converted into wavelengths by the spectrum conversion module 500 to show the wavelengths in the spectrum depending on the order of the EUV light, and the spectrum depending on the order of the EUV light converted from the spectrum conversion module 500 be controlled, by the control module 600, to be moved in the direction of wavelength axis by the calculated difference value.

That is, even when the Al filter 200 is replaced by the Zr filter, the arrangement state of the optical system is the same. Thus, when a spectrum obtained by passing through the Zr filter is moved by the same value as the value for allowing a spectrum obtained by passing through the Al filter 200 to be moved, it is possible to obtain accurate wavelengths of the peaks in accordance with the reference wavelength value depending on the predetermined order of the high-order harmonics.

The Zr filter blocks peripheral wavelengths in a fixed range with respect to 800 nm (preferably, approximately 796 nm) that is a peak wavelength of a femto-second laser beam, and transmits a wavelength of a specific band (preferably, in a range of approximately 7 nm to 17 nm) among wavelengths of the EUV light generated from the EUV generating module 100. That is, it is preferable that the Zr filter block a wavelength of approximately 20 nm or more, and transmit a wavelength in a range of approximately 7 nm to 17 nm.

Meanwhile, according to an embodiment of the present invention, the Al filter and the Zr filter are disposed between the EUV generating module 100 and the diffraction grating 300, but the present invention is not limited thereto. For example, the Al filter and the Zr filter may be disposed between the diffraction grating 300 and the CCD camera 400.

Figure 2:
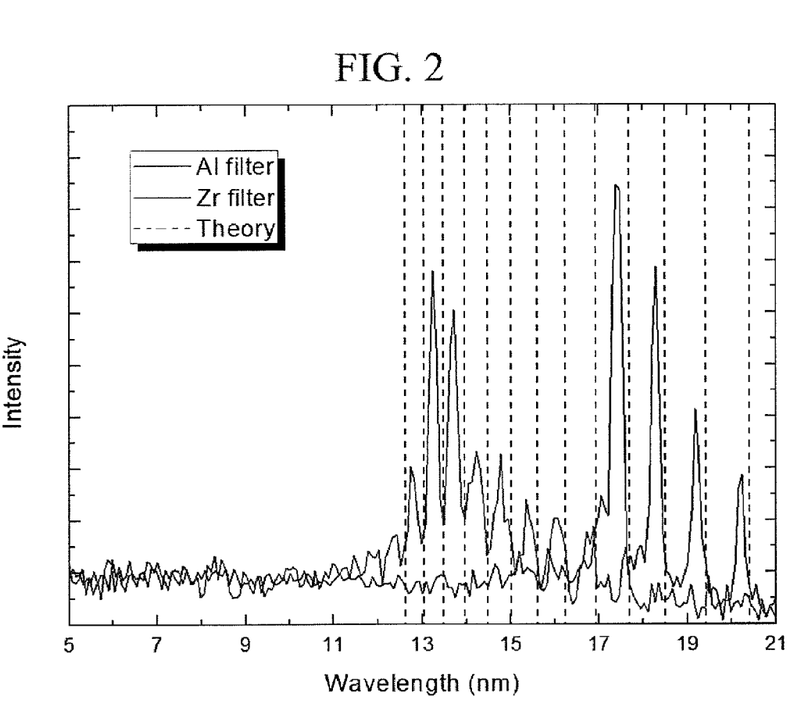
FIGS. 2 to 4 are diagrams illustrating a process of moving, in a direction of a wavelength axis, a spectrum depending on the order of EUV light passing through an Al filter or a Zr filter through a control module applied to an embodiment of the present invention.
Figure 3:
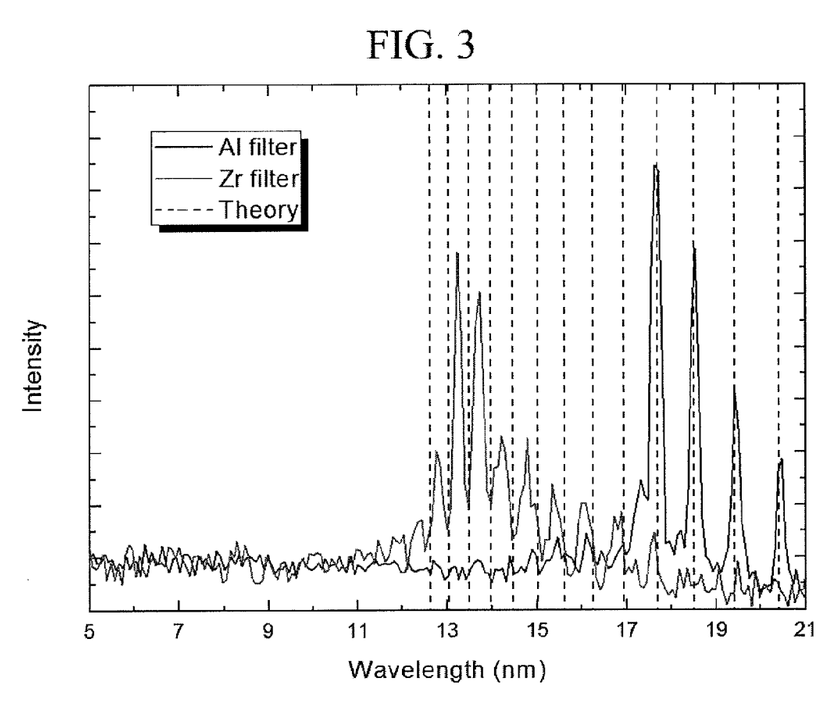
Figure 4:
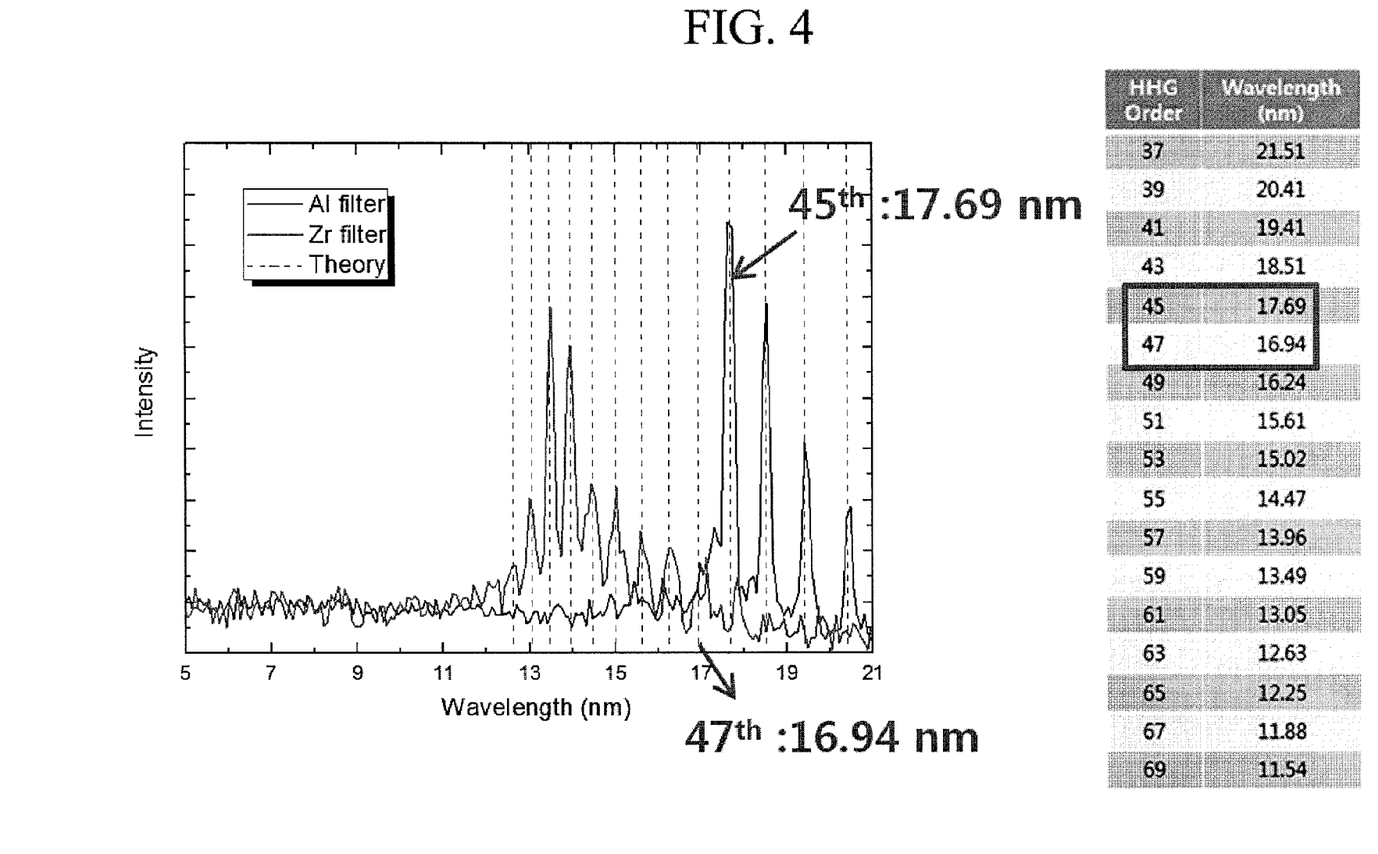

FIGS. 2 to 4 are diagrams illustrating a process of moving, in a direction of a wavelength axis, a spectrum depending on the order of EUV light passing through an Al filter or a Zr filter through a control module applied to an embodiment of the present invention. Here, FIG. 2 illustrates a state in which calibration is not performed on both spectrums passing through the Al filter 200 and the Zr filter, FIG. 3 illustrates a state in which the spectrum passing through the Al filter 200 is first moved in accordance with a reference wavelength value depending on a predetermined order of the high-order harmonics, and FIG. 4 illustrates a state in which the spectrum passing through the Zr filter is also moved by a value (x axis-wavelength) for allowing the spectrum passing through the Al filter 200 to be moved, and then calibration is performed.

Figure 5:
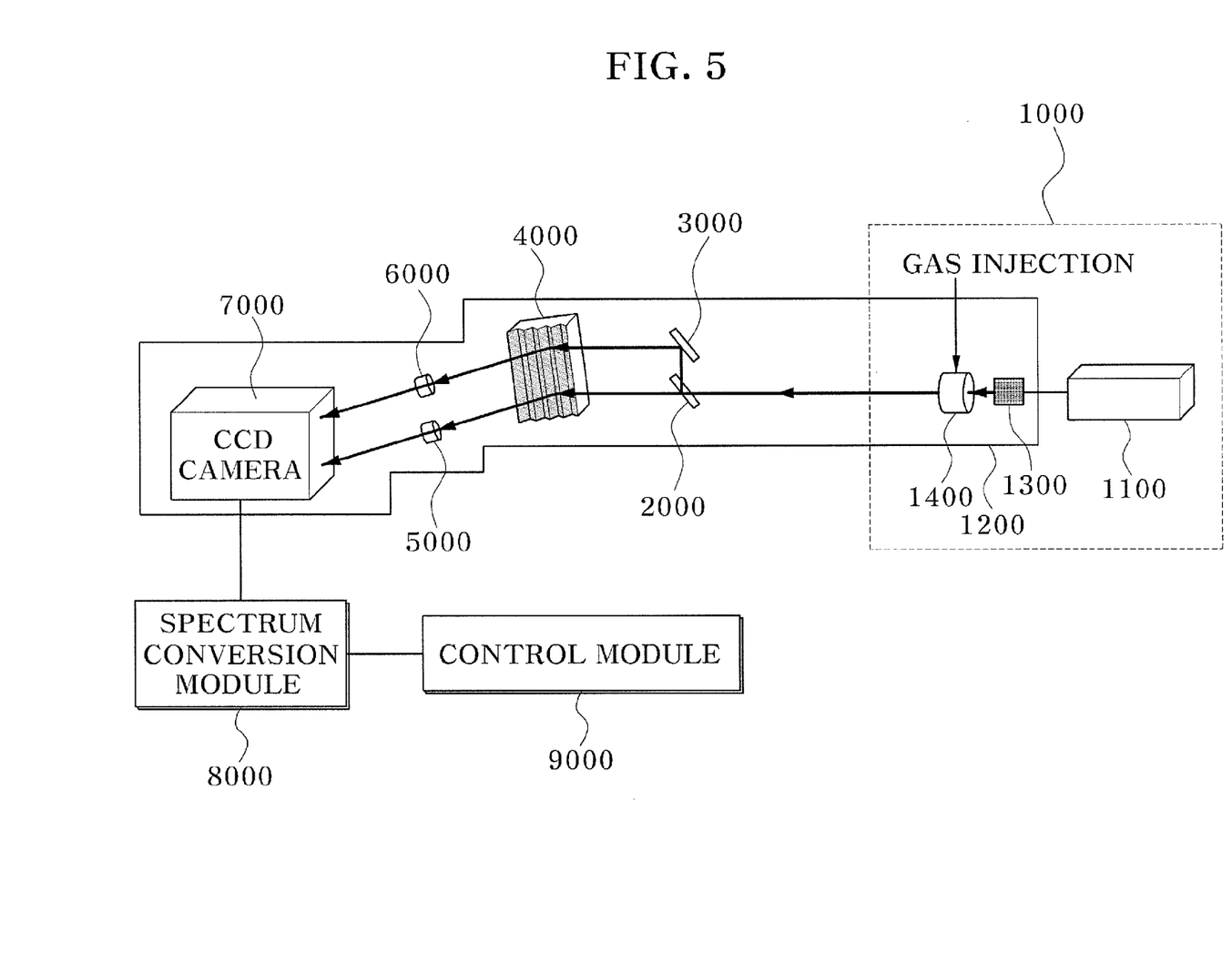
FIG. 5 is an overall conceptual diagram illustrating an apparatus for EUV spectroscope calibration according to another embodiment of the present invention.

FIG. 5 is an overall conceptual diagram illustrating an apparatus for EUV spectroscope calibration according to another embodiment of the present invention.

Referring to FIG. 5, the apparatus for EUV spectroscope calibration according to another embodiment of the present invention roughly includes an EUV generating module 1000, a beam splitter 2000, a reflector 3000, a diffraction grating 4000, an Al filter 5000, a Zr filter 6000, a CCD camera 7000, a spectrum conversion module 8000, and a control module 9000.

Here, the EUV generating module 1000 is a module that generates EUV light by interaction of a laser beam and an inert gas inside a vacuum chamber, and includes a laser beam generating unit 1100, a vacuum chamber 1200, a plurality of optical members 1300, and an EUV generating unit 1400.

The EUV generating module 1000 includes the same components as those of the above-described EUV generating module 100 according to an embodiment of the present invention, and thus detailed descriptions thereof will be omitted.

The beam splitter 2000 splits the EUV light generated from the EUV generating module 1000 into reflected light and transmitted light by transmitting and reflecting the EUV light at a constant ratio (for example, transmitted light 50: reflected light 50).

The reflector 3000 again vertically reflects the reflected light vertically split from the beam splitter 2000.

The diffraction grating 4000 separates, for each wavelength, the reflected light reflected from the reflector 3000 and the transmitted light split from the beam splitter 2000.

The Al filter 5000 transmits a wavelength of a specific band among wavelengths of the transmitted light separated from the diffraction grating 4000 (for example, transmits ≥67% light in a range of approximately 17 nm to 60 nm and transmits <10% light in a range of approximately 17 nm or less).

The Zr filter 6000 transmits a wavelength of a specific band (preferably, in a range of approximately 7 nm to 17 nm) among wavelengths of the reflected light separated from the diffraction grating 4000 and blocks peripheral wavelengths in a fixed range with respect to 800 nm (preferably, approximately 796 nm) that is a peak wavelength of a femto-second laser beam.

The CCD camera 7000 photographs the EUV light transmitted from each of the Al filter 5000 and the Zr filter 6000.

The spectrum conversion module 8000 converts pixels of an image photographed from the CCD camera 7000 into wavelengths to show the wavelengths in a spectrum depending on an order of the EUV light.

The control module 9000 compares a wavelength value corresponding to a maximum peak among peaks of the spectrum depending on the order of the EUV light converted from the spectrum conversion module 8000 and passing through the Al filter 5000 and the Zr filter 6000 with a predetermined reference wavelength value depending on an order of high-order harmonics to calculate a difference value with the closest reference wavelength value, and controls the spectrum depending on the order of the EUV light converted from the spectrum conversion module 8000 and passing through the Al filter 5000 and the Zr filter 6000 to be moved in a direction of wavelength axis by the calculated difference value.

Figure 6:
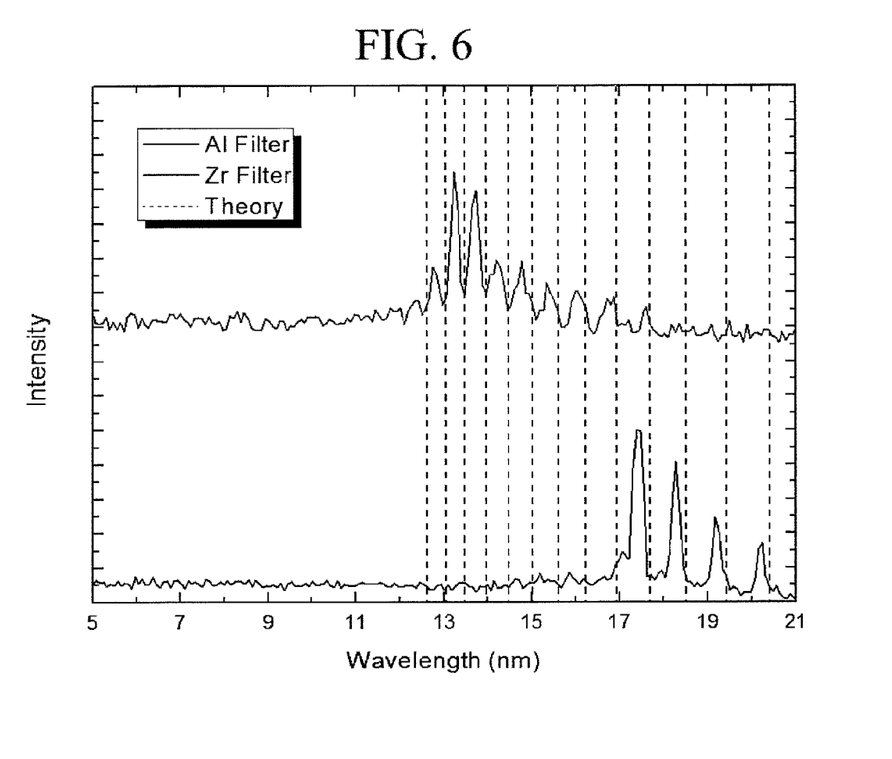
FIGS. 6 and 7 are diagrams illustrating a process of moving, in a direction of a wavelength axis, a spectrum depending on the order of EUV light passing through an Al filter or a Zr filter through a control module applied to another embodiment of the present invention.
Figure 7:
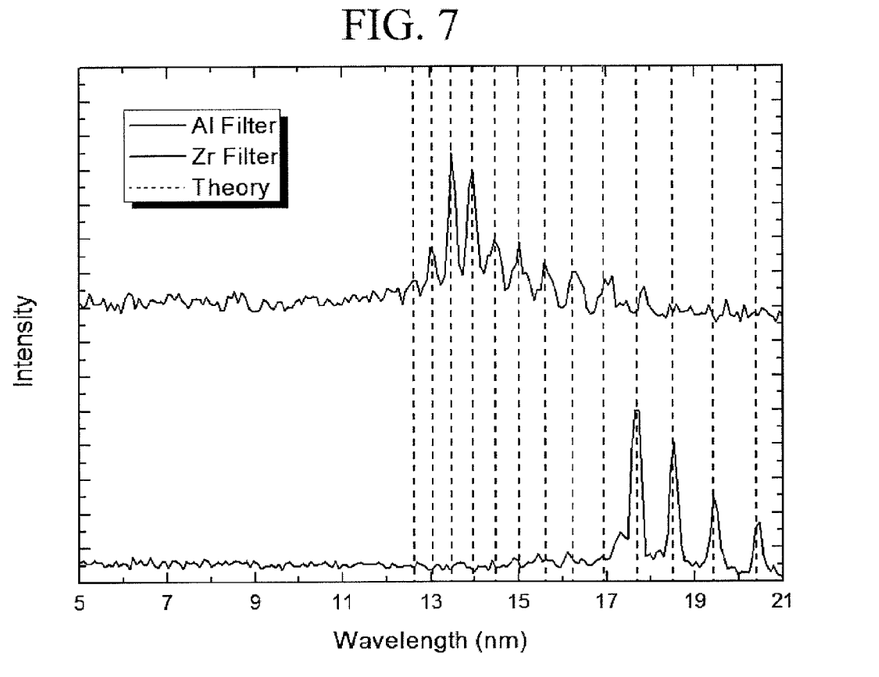

FIGS. 6 and 7 are diagrams illustrating a process of moving, in a direction of a wavelength axis, a spectrum depending on the order of EUV light passing through an Al filter or a Zr filter through a control module applied to another embodiment of the present invention. Here, FIG. 6 illustrates a state in which calibration is not performed on both spectrums passing through the Al filter 5000 and the Zr filter 6000, and FIG. 7 illustrates a state in which the spectrum passing through the Al filter 5000 is moved in accordance with a reference wavelength value (theory value) depending on a predetermined order of the high-order harmonics using transmission characteristics of the Al filter 5000 and the spectrum passing through the Zr filter 6000 is also moved by the same value. That is, a horizontal position (x axis-wavelength) is the same, and therefore two spectrums can be simultaneously moved.

According to the embodiments of the present invention, calibration is performed on the EUV spectroscope using the spectrum conversion module 8000 and the control module 9000 while measuring the EUV spectrum, and therefore it is possible to perform real-time calibration.

Figure 8:
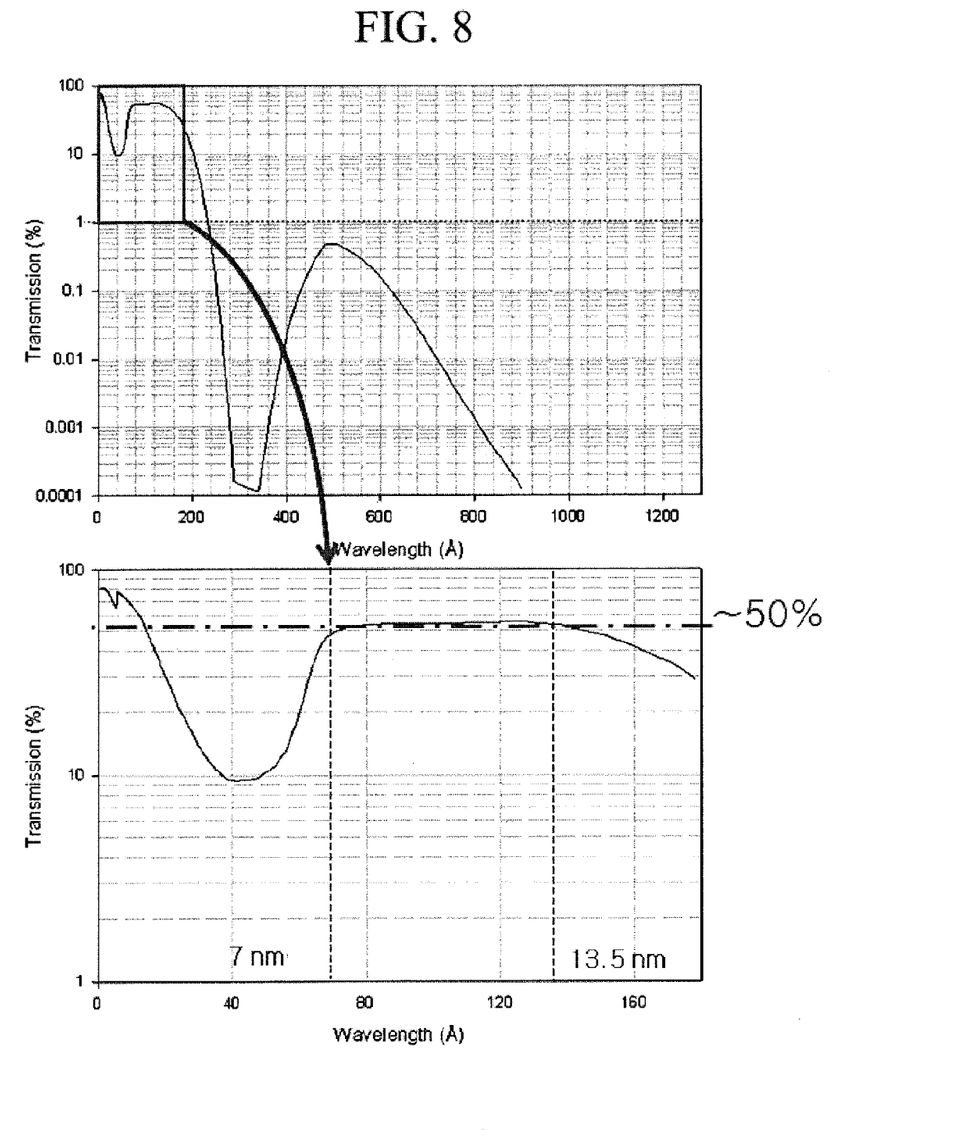
FIGS. 8 and 9 are graphs illustrating a transmission in compliance with a wavelength of a Zr filter applied to embodiments of the present invention.
Figure 9:
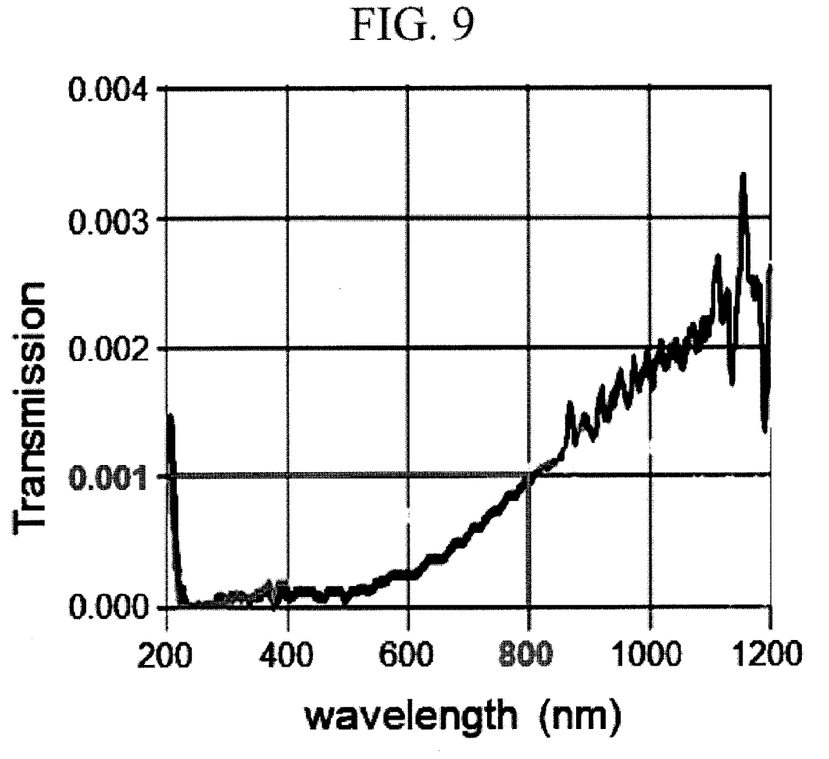
Figure 10:
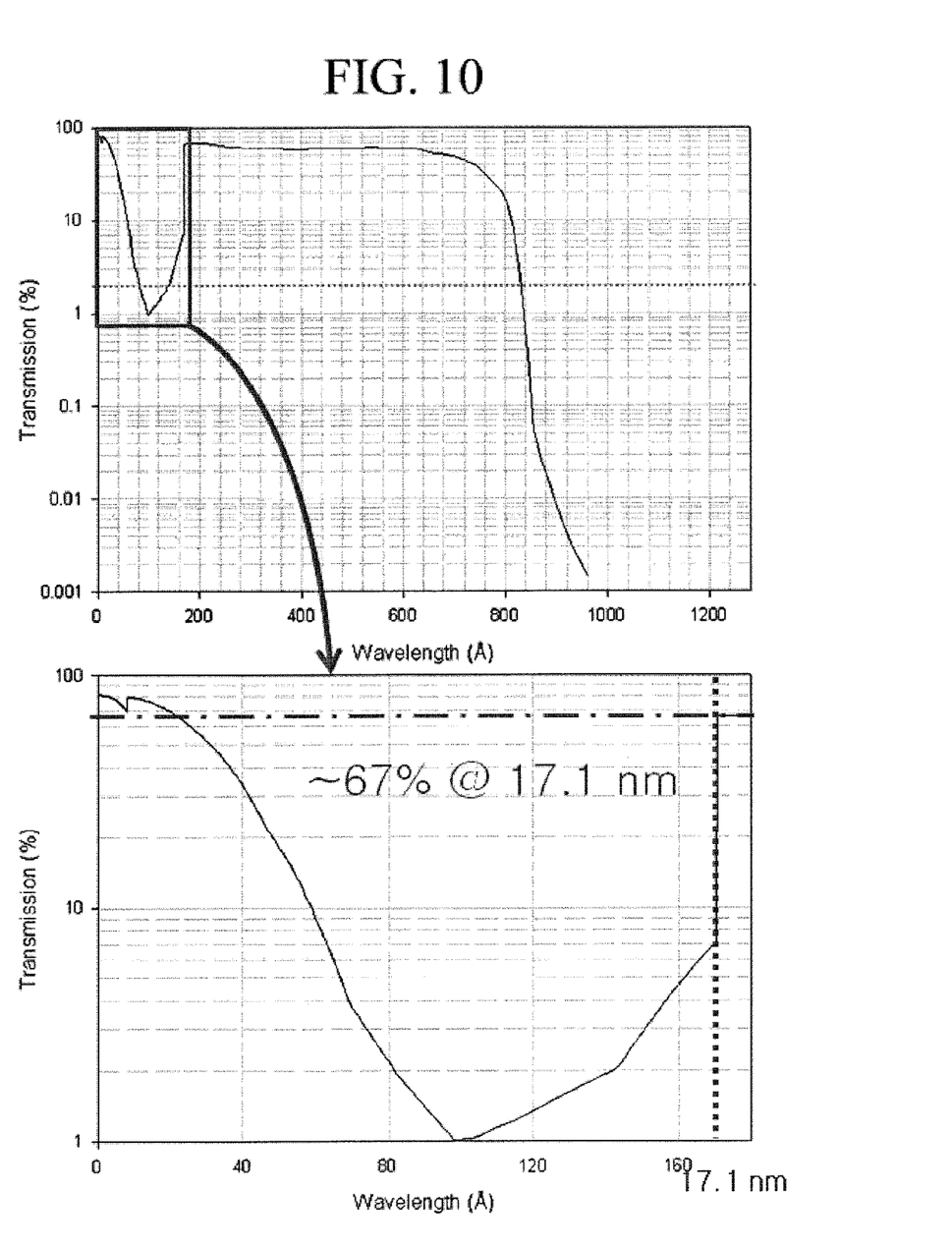
FIGS. 10 and 11 are graphs illustrating a transmission in compliance with a wavelength of an Al filter applied to embodiments of the present invention.
Figure 11:
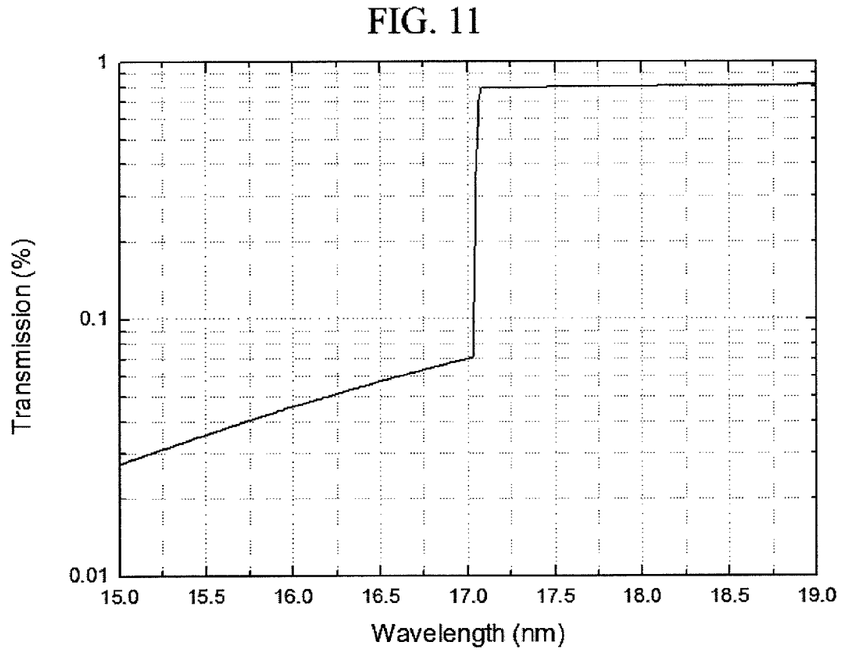

FIGS. 8 and 9 are graphs illustrating a transmission in compliance with a wavelength of a Zr filter applied to embodiments of the present invention, and FIGS. 10 and 11 are graphs illustrating a transmission in compliance with a wavelength of an Al filter applied to embodiments of the present invention.

Referring to FIGS. 8 and 9, the Zr filter applied to the embodiments of the present invention transmits ≤approximately 0.1% light at 800 nm (preferably, approximately 796 nm) that is a peak wavelength of the femto-second laser, and transmits ≥approximately 50% light in a wavelength range of approximately 7 nm to 14 nm.

Referring to FIGS. 10 and 11, the Al filter applied to the embodiments of the present invention transmits ≥approximately 67% light in a wavelength range of approximately 17 nm to 60 nm and transmits <approximately 10% light in a wavelength range of approximately 17 nm or less.

As described above, according to the embodiments of the present invention, the apparatus and method for EUV spectroscope calibration may accurately measure the wavelength of the spectrum of EUV light used in EUV exposure technology and mask inspection technology.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for extreme ultraviolet (EUV) spectroscope calibration, comprising:
   an EUV generating module that generates EUV light by interaction of a laser beam and an inert gas inside a vacuum chamber;
   an Al filter that transmits a wavelength of a specific band among wavelengths of the EUV light generated from the EUV generating module;
   a diffraction grating that separates the EUV light transmitted from the Al filter for each wavelength;
   a CCD camera that photographs the EUV light with a specific band wavelength separated from the diffraction grating;
   a spectrum conversion module that converts pixels of an image photographed from the CCD camera into wavelengths to show the wavelengths in a spectrum depending on an order of the EUV light; and
   a control module that compares a wavelength value corresponding to a maximum peak among peaks of the spectrum depending on the order of the EUV light converted from the spectrum conversion module with a predetermined reference wavelength value depending on an order of high-order harmonics to calculate a difference value with the closest reference wavelength value, and controls the spectrum depending on the order of the EUV light converted from the spectrum conversion module to be moved in a direction of wavelength axis by the calculated difference value.

2. The apparatus for EUV spectroscope calibration of claim 1, wherein, when a Zr filter for transmitting the wavelength of the specific band among the wavelengths of the EUV light generated from the EUV generating module and blocking a wavelength band of a femto-second laser is disposed in the same position as that of the Al filter in a state in which the Al filter is removed, EUV light transmitted from the Zr filter is transmitted to the diffraction grating, the EUV light output from the diffraction grating is photographed by the CCD camera, pixels of an image photographed from the CCD camera are converted into wavelengths by the spectrum conversion module to show the wavelengths in the spectrum depending on the order of the EUV light, and the spectrum depending on the order of the EUV light converted from the spectrum conversion module is controlled, by the control module, to be moved in the direction of wavelength axis by the calculated difference value.

3. The apparatus for EUV spectroscope calibration of claim 2, wherein the Zr filter blocks peripheral wavelengths in a fixed range with respect to 800 nm that is a peak wavelength of a femto-second laser beam, and transmits a wavelength of a specific band in a range of 7 nm to 17 nm.

4. The apparatus for EUV spectroscope calibration of claim 1, wherein the wavelength of the specific band transmitted by the Al filter is in a range of 17 nm to 60 nm.

5. An apparatus for EUV spectroscope calibration comprising:
   an EUV generating module that generates EUV light by interaction of a laser beam and an inert gas inside a vacuum chamber;
   a beam splitter that splits the EUV light generated from the EUV generating module into reflected light and transmitted light by transmitting and reflecting the EUV light at a constant ratio;
   a reflector that again vertically reflects the reflected light vertically split from the beam splitter;
   a diffraction grating that separates, for each wavelength, the reflected light reflected from the reflector and the transmitted light split from the beam splitter;
   an Al filter that transmits a wavelength of a specific band among wavelengths of the transmitted light separated from the diffraction grating;
   an Zr filter that transmits a wavelength of a specific band among wavelengths of the reflected light separated from the diffraction grating and blocks a wavelength band of a femto-second laser;
   a CCD camera that photographs the EUV light transmitted from each of the Al filter and the Zr filter;
   a spectrum conversion module that converts pixels of an image photographed from the CCD camera into wavelengths to show the wavelengths in a spectrum depending on an order of the EUV light; and
   a control module that compares a wavelength value corresponding to a maximum peak among peaks of the spectrum depending on the order of the EUV light converted from the spectrum conversion module and passing through the Al filter and the Zr filter with a predetermined reference wavelength value depending on an order of high-order harmonics to calculate a difference value with the closest reference wavelength value, and controls the spectrum depending on the order of the EUV light converted from the spectrum conversion module and passing through the Al filter and the Zr filter to be moved in a direction of wavelength axis by the calculated difference value.

6. A method for EUV spectroscope calibration comprising:
   (a) generating EUV light by interaction of a laser beam and an inert gas inside a vacuum chamber;
   (b) transmitting, by an Al filter, a wavelength of a specific band among wavelengths of the EUV light generated in the (a) generating;
   (c) separating, by a diffraction grating, the EUV light transmitted in the (b) transmitting for each wavelength;
   (d) photographing, by a CCD camera, the EUV light with a specific band wavelength separated in the (c) separating;

(e) converting, by a spectrum conversion module, pixels of an image photographed in the (d) photographing into wavelengths to show the wavelengths in a spectrum depending on an order of the EUV light; and (f) comparing, by a control module, a wavelength value corresponding to a maximum peak among peaks of the spectrum depending on the order of the EUV light converted in the (e) converting with a predetermined reference wavelength value depending on an order of high-order harmonics to calculate a difference value with the closest reference wavelength value, and moving the spectrum depending on the order of the EUV light converted in the (e) converting in a direction of wavelength axis by the calculated difference value.

7. The method for EUV spectroscope calibration of claim 6, after the (f) comparing, when a Zr filter is disposed in the same position as that of the Al filter in a state in which the Al filter in the (b) transmitting is removed, further comprising:

(g) transmitting, by the Zr filter, the wavelength of the specific band among the wavelengths of the EUV light generated in the (a) generating and blocking a wavelength band of a femto-second laser;

(h) separating, by the diffraction grating, the EUV light transmitted in the (g) transmitting for each wavelength;

(i) photographing, by the CCD camera, the EUV light with a specific band wavelength separated in the (h) separating;

(j) converting, by the spectrum conversion module, pixels of an image photographed in the (i) photographing into wavelengths to show the wavelengths in the spectrum depending on the order of the EUV light; and (k) moving, by the control module, the spectrum depending on the order of the EUV light converted in the (j) converting in the direction of wavelength axis by the difference value calculated in the (f) comparing.

8. The method for EUV spectroscope calibration of claim 7, wherein the Zr filter in the (g) transmitting blocks peripheral wavelengths in a fixed range with respect to 800 nm that is a peak wavelength of a femto-second laser beam, and transmits a wavelength of a specific band in a range of 7 nm to 17 nm.

9. The method for EUV spectroscope calibration of claim 6, wherein the wavelength of the specific band transmitted by the Al filter in the (b) transmitting is in a range of 17 nm to 60 nm.

10. A method for EUV spectroscope calibration comprising:

(a') generating EUV light by interaction of a laser beam and an inert gas inside a vacuum chamber;

(b') splitting, by a beam splitter, the EUV light generated in the (a') generating into reflected light and transmitted light by transmitting and reflecting the EUV light at a constant ratio;

(c') again vertically reflecting, by a reflector, the reflected light vertically split in the (b') splitting;

(d') separating, by a diffraction grating, the reflected light reflected in the (c') again vertically reflecting and the transmitted light split in the (b') splitting for each wavelength;

(e') transmitting, by an Al filter, a wavelength of a specific band among wavelengths of the transmitted light separated in the (d') separating;

(f') transmitting, by a Zr filter, a wavelength of a specific band among wavelengths of the reflected light separated in the (d') separating and blocking a wavelength band of a femto-second laser;

(g') photographing, by a CCD camera, the EUV light transmitted in the (e') transmitting and the (f') transmitting;

(h') converting, by a spectrum conversion module, pixels of an image photographed in the (g') photographing into wavelengths to show the wavelengths in a spectrum depending on an order of the EUV light; and (i') comparing, by a control module, a wavelength value corresponding to a maximum peak among peaks of the spectrum depending on the order of the EUV light converted in the (h') converting and passing through the Al filter and the Zr filter with a predetermined reference wavelength value depending on an order of high-order harmonics to calculate a difference value with the closest reference wavelength value, and moving the spectrum depending on the order of the EUV light converted in the (h') converting and passing through the Al filter and the Zr filter in a direction of wavelength axis by the calculated difference value.

\* \* \* \* \*